May 8, 1962

W. S. STOKES 3,033,724

LAMINATED PROTECTIVE SHEATH IN SHEET FORM AND
METHOD OF APPLYING SAME TO A PIPE

Filed March 26, 1956

WILLIAM S. STOKES
INVENTOR.

BY

ATTORNEY

United States Patent Office 3,033,724
Patented May 8, 1962

3,033,724
LAMINATED PROTECTIVE SHEATH IN SHEET FORM AND METHOD OF APPLYING SAME TO A PIPE
William S. Stokes, Los Angeles County, Calif., assignor, by mesne assignments, to Plicoflex, Inc., a corporation of Delaware
Filed Mar. 26, 1956, Ser. No. 574,020
9 Claims. (Cl. 154—50)

This invention relates to the art of protecting metal objects against deterioration in underwater and underground installations and is directed specifically to the use of protective sheet material to cover metal surfaces for this purpose. The invention has special utility for undersea protection of pipes, piling, cables, the hulls of ships, etc., as well as for protection of subterranean pipelines. For the purpose of disclosure, the invention will be described as applied specifically to the protection of a pipeline.

It has been found that a sheath for the protective covering of a pipeline and sheath material used for this purpose must meet certain requirements where the pipeline is submerged in sea water. Any protective covering meeting these requirements will, of course, serve the same purpose for underground installations. These requirements are:

(1) The exposed sheath material must have a long service life in sea water. For this purpose, it must be strong, tough, nonoxidizing, and it must resist solvents and chemicals found in sea water and soil.

(2) The sheath material must repel marine life, including teredos, sea worms, barnacles, and must also resist aerobic and anaerobic bacteria.

(3) It must be an impermeable dielectric sheath to prevent electrochemical corrosion of the metal surface of the pipeline and to prevent osmosis and electroendosmosis; i.e., the migration of water under the influence of an electrical potential.

(4) All joints or laps of the sheath enclosing the pipe must be fluid-tight.

(5) The sheath must, in effect, be unitary with the pipe it covers with no voids or air pockets within the structure of the sheath itself or between the sheath and the surface of the pipe.

(6) No voids or openings for the entrance of water or air must develop as a result of any shrinkage, hardening, curing or other aging effects that may occur with the pasage of time after the sheath is applied.

Generally described, the invention meets these requirements by the following provisions:

(1) A multiple layer sheet is used, preferably in tape form. The sheet has an outer protective layer of a tough, impervious, chemically resistant synthetic resin that is capable of a long service life in sea water or underground.

(2) The laminated sheet or tape is made repellent to marine life and bacteria by a dispersion of finely divided copper in the outermost layer. It has been found that such a copper-bearing layer made of tough, impervious, synthetic resin is especially advantageous because the mere exposure of small copper particles is enough to repel marine life and new copper particles are exposed whenever the sheath is subject to even minute abrasion or erosion.

(3) Electrochemical corrosion is precluded by using an impermeable tape structure that electrically insulates the copper particles from the metal surfaces of the pipe. If desirable, a tough, copper-free layer of a suitable dielectric synthetic resin may be interposed under the outer copper-laden layer.

(4) The sheath is made fluid-tight by overlapping the sheet material and by providing the sheet material with an inner sealing layer of relatively soft, easily deformable material that flows under relatively light pressure. To cover a pipeline, for example, the tape is helically wound on the pipeline in an overlapping manner with the inner layer serving as a sealant at the overlapping portions of the helical turns.

(5) The sheath is made unitary with the pipeline and free of any void or airpockets by virtue of the following provisions:

(a) By providing an inner layer that is of sufficient rigidity to maintain its initial configuration until the tape is used but is sufficiently deformable and flowable under light pressure to be extruded when the tape is wrapped around the pipe with the tape under tension. Thus, in the helical wrapping operation, the extrusion of the material of the inner layer forms marginal beads along both sides of the winding tape, and, where a helical turn of the tape overlaps a marginal edge of the previous turn, the soft inner layer in making contact with marginal edge flows to conform with the marginal edge and to merge with the previously extruded bead along the marginal edge. Thus, the capability of the inner layer for flow and extrusion eliminates any voids under the tape. In addition, the soft inner layer extrudes slightly to form a transverse circumferentially advancing bead that fills minute recesses and irregularities in the surface structure of the pipe and displaces air from under the tape.

(b) By bonding the relatively soft inner layer to the impervious outer layer so effectively that the adhesive strength between the two layers exceeds the cohesive strength of the inner layer. Such effective bonding precludes any possibility of subsequent separation of the two layers.

(c) In some practices of the invention, the application of a suitable tacky precoat to the surface of the metal pipe prior to the application of the tape serves to fill all the minute surface depressions of the pipe, and further serves to make the bond of the tape with the pipe so effective that the adhesive strength between the inner layer and the pipe exceeds the cohesive strength of the inner layer. Such precoating is especially desirable for old or used pipe to fill the surface pits of the pipe in advance and thus facilitate the exclusion of air pockets by the extruded circumferentially advancing bead of the inner layer of the tape.

(6) The development of openings or voids in the applied tape with the passage of time that might admit air and water is avoided by the combination of a tough, resilient, impervious outer layer that shrinks as it ages and a soft inner layer that ages slowly, and, therefore, remains flowable for an extensive adjustment period after the tape is applied. During this initial adjustment period before the inner layer hardens and apparently cures to the point of resisting cold flow, the slow contraction of the outer layer causes continuous slow extrusion of the material of the inner layer at the exposed edges of the helical turns and thus aggressively precludes the formation of any voids or openings whatsoever that might admit air or water. Even if the installed tape is accidentally punctured, the inner layer will cold flow to protect the underlying pipe against exposure at the puncture. After the initial adjustment period when the inner layer is cured to the point of complete resistance to extrusion, the continued shrinkage of the resilient outer layer increases the circumferential tension of the tape at an exceedingly gradual rate to continue the aggressive prevention of the formation of voids or openings.

The objects, features and advantages of the invention may be further understood from the following detailed description considered with the accompanying drawings.

In the drawing, which is to be regarded as merely illustrative:

Figure 3:
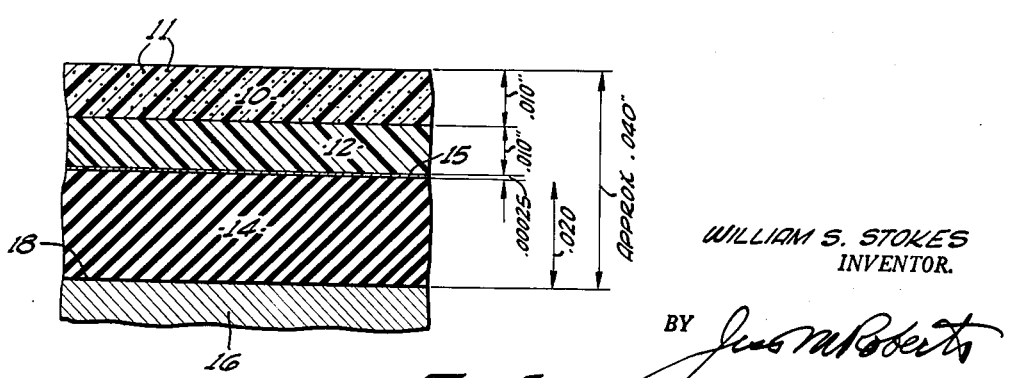
FIG. 3 is a greatly enlarged cross section of the applied tape along the line 3—3 of FIG. 2.

The laminated tape shown in the drawing is the presently preferred embodiment of the invention for application to undersea pipelines and other metal structures that are exposed to the ravages of marine life. This embodiment of the tape includes an outermost layer 10 of polyvinyl chloride with finely divided particles 11 of copper dispersed therein, an intermediate dielectric or insulating layer 12 that is also polyvinyl chloride, and a relatively soft, readily deformable inner layer 14 of Butyl rubber compound. Butyl rubber, a synthetic rubber-like material, which is a copolymer of an olefine and a diolefine, for example, a copolymer of a major proportion of isobutylene and a minor proportion of a diolefine copolymerizable therewith, such as, butadiene 1,3 isoprene 2,3-dimethylbutadiene-1,3 pentadiene 1,3 is referred to in British Patent 523,248 and in Industrial and Engineering Chemistry, 32, pages 1283 et seq. (1940). The two outer layers 10 and 12 of polyvinyl chloride are, in effect, integral with each other since they are bonded or welded together by the application of heat and pressure. A suitable adhesive may be used for this purpose, if desired. The insulating layer 12 is bonded to the inner layer 14 by an exceedingly thin layer 15 of an adhesive composition to be described hereafter. For the purpose of the present disclosure, this adhesive composition is termed a keying solution. Finally, in one practice of the invention, the metal surface that is to be protected by the tape is precoated with a priming coat 18 to provide an additional layer. Thus, FIG. 3 shows the inner layer 14 bonded to the surface of a metal pipe 16 by an exceedly thin priming layer or coat 18.

The application of the priming coat 18 may be omitted since it is usually unnecessary, especially when the metal surface of the pipe is in good condition. If the pipe is not under water where it may be attacked by marine life, the outer layer 10 and the copper particles 11 will ordinarily be omitted. Thus, for protecting underground installations of pipe, the tape may comprise simply the polyvinyl layer 12, the keying layer 15 and the soft inner layer 14.

The polyvinyl chloride for the outermost layer 10 may advantageously be formulated with dibutyl or dioctyl phthalate as the plasticizer. The copper powder that is dispersed in this outermost layer is preferably small enough to pass through a 300-mesh screen, but the particle size is not critical. The intermediate layer 12 of polyvinyl chloride is made with the same plasticizer and may contain a suitable filler, such as zinc or lead oxide.

The inner layer 14 of the Butyl rubber compound has a minimum thickness of .010 inch, and, in this instance, is approximately .020 inch thick. The preferred formula for this inner layer, in parts by weight, is as follows:

New Butyl rubber _____ 15.8
Reclaimed Butyl rubber (Grade S 806 supplied by Xylos Rubber Co.) _____ 14.1
Asphalt (melting point 170°–180° F.) (Petrolastic supplied by Standard Oil Company of California) _____ 13.2
Clay (Aluminum Silicate Super X) _____ 19.8
Cumar P-10 _____ 4.5
Polybutene 128 _____ 2.6

Total _____ 70.0

The inclusion of the reclaimed Butyl rubber introduces a sulfur content which apparently eventually results in substantial curing of the inner layer, but the curing operation is prolonged over a period of months. Cumar is a synthetic resin mixture of polymerized coumarone, indene, and associated coal tar compounds that is produced by the Barrett Division of the Allied Chemical and Dye Corporation. Polybutene 128 is one of a series of polymers of isobutene produced by the Standard Oil Company of Indiana.

The function of the asphalt is to lend tenacity and toughness to the inner coat and to contribute to its flowability. The Cumar increases the tack of the inner layer composition and is also a stabilizing agent. It is a softener and an extender. It assists in the uniform distribution of the sulfur content of the inner layer and reduces the tendency of the inner layer to cure to an undesirable extent before the tape is actually used.

The polybutene is a stable, nonoxidizing, softening oil that does not dry out with the passage of time. It reduces the aging rate of the Butyl rubber and is a tack-inducing agent that maintains the adhesive quality of the inner layer.

A feature of the preferred practice of the invention for undersea installations is the concept of further adding a suitable copper compound to the composition of the inner layer 14. For this purpose, I may add Milmer 1 (Monsanto), which is copper-8-quinolinolate. This copper compound is repellent to marine life and resists fungi and bacteria. The addition of this copper compound is especially desirable because extruded beads of the material of the inner layer are exposed in the protective sheath that is formed by spirally winding the laminated tape around a pipe.

The keying solution that provides the keying layer 15 between the inner Butyl rubber layer 14 and the adjacent polyvinyl chloride layer may have the following composition in parts by weight:

| | Parts |
|---|---|
| New Butyl rubber | 50 |
| Reclaimed Butyl rubber | 150 |
| Polybutene 128 | 10 |
| Asphaltum (melting point 170° to 180° F.) | 200 |
| Cumar P-10 | 25 |

Fifteen parts by volume of this mixture is added to 85 parts by volume of hexane to form the solution that is applied to make the desired bond between the two layers 12 and 14. The hexane, of course, evaporates rapidly when the mixture is applied as a thin coating.

The polybutene, asphaltum and Cumar have the same functions in the keying solution as discussed above with reference to the composition of the inner layer 14.

The priming coat 18 may be of the same composition as the keying solution, but the proportion of hexane is reduced to make the composition more viscous, since the priming coat should be applied with sufficient thickness to at least partially fill minute pits or depressions in the surface of the pipe.

The dibutyl or dioctyl phthalate in the polyvinyl chloride not only gives the polyvinyl chloride desirable physical properties, but is also highly desirable because of its solvent effect on Butyl rubber. There is reason to believe that the use of this plasticizer in the polyvinyl chloride contributes materially to the bond between the polyvinyl and the inner layer 14 of the Butyl rubber compound. The high Butyl rubber content of the keying layer 15 and the priming coat 18 also contributes to the effectiveness of the bond between the inner layer 14 and the polyvinyl chloride and the bond between the inner layer and the surface of the metal pipe. The polybutene in the keying solution and in the priming coat also contribute to the bonding effectiveness at the two surfaces of the inner layer 14. As a result of these and other factors, the adhesive strength between the inner layer 14 and the outer polyvinyl chloride and the adhesive strength between the inner layer and the metal pipe 16 greatly exceeds the internal or cohesive strength of the inner layer. This fact may be demonstrated by forcibly unwrapping the applied tape from a metal pipe. The separation occurs wholly within the inner layer 14, the bond between the inner layer and the polyvinyl chloride being too great to permit the polyvinyl chloride to peel away from the inner layer and the bond between the inner layer and the metal surface of the pipe being too great to permit the inner layer to peel away from the pipe.

Figure 1:
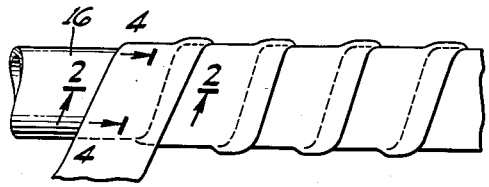
FIG. 1 is a fragmentary plan view of a pipeline in the process of being wrapped with a laminated tape embodying one practice of the present invention.
Figure 4:
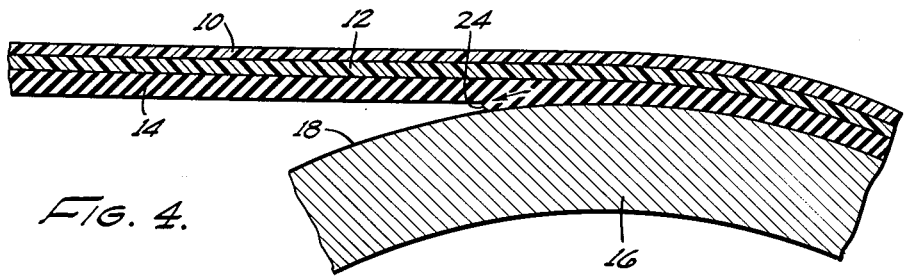
FIG. 4 is an enlarged section along the line 4—4 of FIG. 1, showing how a circumferentially advancing bead of the material of the inner layer is formed as the tape is wound onto the pipeline under tension.

In the preferred method of applying the tape to a metal pipe, the tape is wound onto the pipe in the manner indicated by FIGS. 1 and 4 with the tape maintained under tension, the pull on the tape being preferably of the approximate magnitude of 5 to 10 pounds per inch of width of the tape. The inner layer is sufficiently soft and is of such character as to be readily deformable and to flow to a slight but important extent under this magnitude of pressure. For this purpose, the thickness of the inner layer 14 must be at least .010 inch. The Shore hardness of the inner layer may be on the order of 20.

Figure 2:
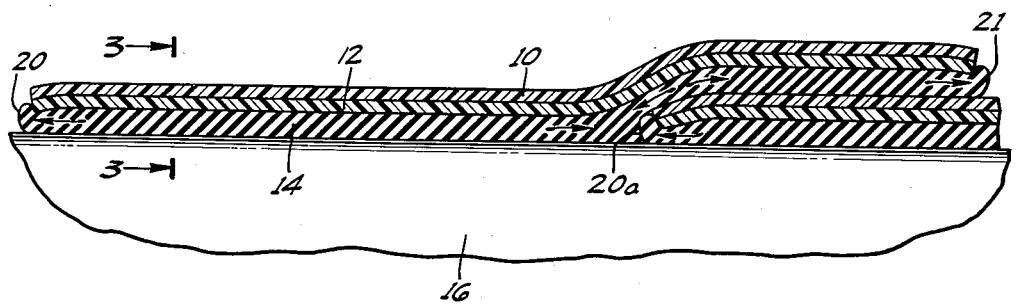
FIG. 2 is an enlarged cross section of the overlapping turns of the tape taken along the line 2—2 of FIG. 1.

With an inner layer 14 of this character, the application of the tape under tension results in flow and extrusion of the material of the inner layer in the manner indicated by the various arrows in FIGS. 2 and 4. Thus, the inner layer material extrudes along each longitudinal edge of the tape to form marginal beads, as shown at 20 and 21 in FIG. 2. The arrows in FIG. 2 indicate how the yielding semifluid character of the inner layer 14 causes it to flow and deform locally in the region of the underlying edge of the immediately previous helical turn of the tape. Thus, in the region of the previously extruded marginal bead 20a, the material of the inner layer 14 flows and deforms to completely eliminate any void whatsoever. It is an important feature of the invention that the material of the inner layer 14 responds to the tension-induced pressure in this manner with the extrusion produced in winding one turn cooperating with the flow produced by the winding of the next successive turn to eliminate the usual void that is created in the overlapping regions of a spirally wound tape.

The yielding semifluid character of the inner layer 14 also results in the extrusion of a circumferentially advancing bead in the region of tangential contact of the progressively applied tape with the surface of the pipe. Such a circumferentially advancing bead is shown at 24 in FIG. 4, this bead being created by flow or extrusion, as indicated by the adjacent arrow.

The circumferentially advancing bead 24 makes rolling contact with the surface of the pipe 16, and, in doing so, completely fills minute pits and depressions in the surface texture of the pipe instead of merely bridging over such pits and depressions. Thus, the rolling bead 24 completely expels all air out from under the advancing tape. This action occurs only if the inner layer 14 has the indicated degree of fluidity, and only if the inner layer has the required thickness.

It may be readily appreciated that the effective bonding together of the layers of the tape and the described flowing action of the inner layer 14 of the tape result in a sheath of spirally wound tape that is completely unified with the pipe 16 without any voids whatsoever either in the sheath structure or between the sheath structure and the metal surface of the pipe. The copper particles repel marine life and the dielectric composition of the tape precludes any electrochemical corrosion or other deleterious effect that might be caused by the presence of the copper in the region of the metal pipe.

After the tape is applied, the inner layer 14 cures so slowly that it remains semifluid for an adjustment period that may extend over several months. The tape is under tension when applied and it shrinks gradually with aging. If unrestrained, this shrinkage may eventually amount to 7% in all directions. During the initial adjustment period, the shrinkage of the tape results in corresponding continued progressive extrusion of the material of the inner layer 14 at the exposed marginal bead 21. This continued extrusion may be relied upon to preclude the formation of any voids or entrance openings in the sheath. It is also important to note that the yielding of the inner layer by extrusion when the outer layers shrink is highly advantageous in keeping the outer layers from being excessively stressed in tension. Without this yielding action over a period of time after the application of the tape, the polyvinylchloride would be overstressed and tend to crack.

When the material of the inner layer cures to the point of preventing further extrusion, its stable solidity precludes the formation of any voids or openings, and the continued tendency of the polyvinyl chloride to shrink is further warranty against such voids. Since the polyvinyl chloride is restrained against further diametrical contraction by the advanced curing of the inner layer, its tension continues to increase with age. This continued increase in tension is tolerable because of the high resiliency of polyvinyl chloride and, moreover, is desirable to keep the sheath highly effective for its purpose. Thus, the spirally wound sheath of the invention improves with the passage of time.

An important feature of the invention is that the incorporation of the soft Butyl rubber inner layer 14 into the construction of the tape makes possible rapid fabrication of the spirally wound sheath. In those instances where the priming coat 18 is omitted, the fabrication of the spirally wound sheath is an exceedingly simple matter, since it is merely necessary to wind the sheath under the required tension. This feature of the invention requires that, on the one hand, the material of the inner coat be sufficiently soft and semifluid for its purpose, and, on the other hand, that the inner layer 15 be sufficiently stable to maintain its original configuration until the tape is actually used.

As heretofore stated, if the tape is to be used in the described manner, for the protection of an underground pipe as distinguished from an undersea pipe, the copper particles may be omitted and one of the two polyvinyl layers 10 and 12 may be omitted. The simplified tape is applied in the same manner as described above and has the same advantages that are inherent in the combined layers of material.

My description in specific detail of the presently preferred practice of the invention will suggest various changes, substitutions and other departures from my disclosure that fall within the scope and spirit of the appended claims.

I claim as my invention:

1. A laminated flexible sheet for application to a metal object for protection thereof, comprising: a backing layer of tough, flexible impervious synthetic resin resistant to substances found in soil; and an inner layer adherent thereto at least as thick as said backing layer of an adhesive composition having sufficient rigidity to maintain its initial configuration until the sheet is applied for its purpose, said inner layer being readily deformable and being flowable under pressure applied by wrapping the sheet around a metal object under tension of approximately five to ten pounds per inch of width of the sheet thereby to extrude to form side edge beads during the wrapping operation to fill in voids at underlying side edges of the sheet where wrapped turns of the sheet overlap and to extrude to form a transverse circumferentially advancing bead to fill depressions in the surface of the metal object.

2. A laminated flexible sheet as set forth in claim 1 in which said inner layer includes an elastomer and a relatively small amount of a curing agent.

3. A laminated flexible sheet as set forth in claim 1 in which said outer layer is a vinyl resin, and in which said inner layer is an uncured copolymer of a major portion of isobutylene and a minor portion of a diolefine copolymerizable therewith.

4. A laminated flexible sheet for application to a metal object for protection thereof, consisting essentially of a backing layer of tough, flexible impervious synthetic resin resistant to substances found in soil; and an inner layer at least as thick as said backing layer comprising uncured Butyl rubber and at least one tack-inducing agent, said inner layer being adhered to said outer layer and having sufficient rigidity to maintain its initial configuration until the sheet is used, said inner layer being readily deformable and being flowable under pressure applied by wrapping the sheet around the metal object under tension of approximately five to ten pounds per inch of width of the sheet thereby to extrude to form side edge beads during the wrapping operation to fill in voids at underlying side edges of the sheet where wrapped turns of the sheet overlap and to extrude to form a transverse circumferentially advancing bead to fill depressions in the surface of the metal object.

5. A laminated flexible sheet as set forth in claim 4 in which said outer layer is a vinyl resin; in which said inner layer contains reclaimed Butyl rubber; and in which said inner layer is bonded to the outer layer by the residue from the evaporation of an adhesive solution containing a volatile solvent, Butyl rubber, and at least one tack-inducing agent.

6. A method of forming a protective sheath on an elongated object such as a pipe without trapping air adjacent the surface of the object, including the step of spirally winding onto the object a tape under a tension of at least approximately five to ten pounds per inch in width of the tape, said tape having a tough, impervious backing layer and an innermost layer adherent thereto of at least the same thickness of a readily deformable adhesive composition that is flowable under the pressure created by said tension, whereby said adhesive composition is extruded along the side edges of the tape to fill the voids at the underlying edges of the applied tape and is extruded along the advancing line of contact of the tensioned tape to fill the minute recesses in the surface of the object.

7. A method as set forth in claim 6 which includes a preliminary step of coating the surface of the object with a fluid material that is adherent both to the surface of the object and to said innermost layer of the tape.

8. A method as set forth in claim 7 in which said innermost layer of the tape is essentially Butyl rubber and a substantial portion of said fluid coating material is Butyl rubber.

9. A method as set forth in claim 8 in which at least the major portion of the solids of said fluid coating material is Butyl rubber and asphalt.

References Cited in the file of this patent

UNITED STATES PATENTS

| | | |
|---|---|---|
| Re. 23,843 | Oace | June 29, 1954 |
| 2,201,877 | Anderson | May 21, 1940 |
| 2,333,641 | Corwin | Nov. 9, 1943 |
| 2,439,481 | Martin | Apr. 13, 1948 |
| 2,506,165 | Mountcastle | May 2, 1950 |
| 2,555,745 | Hopkins et al. | June 5, 1951 |
| 2,601,016 | Hendricks et al. | June 17, 1952 |
| 2,646,371 | McGarry | July 21, 1953 |
| 2,709,148 | Jacque | May 24, 1955 |
| 2,713,383 | Kennedy | July 19, 1955 |
| 2,734,882 | Kirsch | Feb. 14, 1956 |
| 2,739,881 | Kepple | Mar. 27, 1956 |
| 2,769,722 | Converse | Nov. 6, 1956 |

FOREIGN PATENTS

| | | |
|---|---|---|
| 607,224 | Great Britain | Aug. 27, 1948 |
| 704,096 | Great Britain | Feb. 17, 1954 |